United States Patent [19]

Stiver

[11] Patent Number: 4,573,718

[45] Date of Patent: Mar. 4, 1986

[54] FLY TYING COMBINATION TOOL

[76] Inventor: Robert N. G. Stiver, Box 166, R.D. 2, Mill Hall, Pa. 17751

[21] Appl. No.: 619,927

[22] Filed: Jun. 12, 1984

[51] Int. Cl.⁴ .................................. D03J 3/00
[52] U.S. Cl. ........................................ 289/17
[58] Field of Search .............. 289/17; 43/1, 4; 7/158, 7/161, 168, 170

[56] References Cited

U.S. PATENT DOCUMENTS

| | | | |
|---|---|---|---|
| 1,619,744 | 3/1927 | McCloskey | 7/168 X |
| 2,899,226 | 8/1959 | Lint | 289/17 |
| 3,131,957 | 5/1964 | Musto | 289/17 |
| 3,150,892 | 9/1964 | Kosrow | 289/17 |
| 3,625,556 | 12/1971 | Stromberg | 289/17 |
| 3,694,014 | 9/1972 | Rossbach | 289/17 |
| 3,803,649 | 4/1974 | Skutt et al. | 7/158 X |
| 3,965,605 | 6/1976 | Allen | 289/17 X |

*Primary Examiner*—Louis K. Rimrodt
*Attorney, Agent, or Firm*—John S. Roberts, Jr.; William J. Bundren

[57] ABSTRACT

This invention is a fly-tier's combination instrument comprising a hackle plier clasp, two knot-tying tools of different diameter, a fur and hair spinning tool, and a dubbing pluck needle. These tools are combined in a telescoping instrument providing flexibility and ease of fly tying wet flies, dry flies, nymphs, streamers, and other fly tying patterns.

10 Claims, 7 Drawing Figures

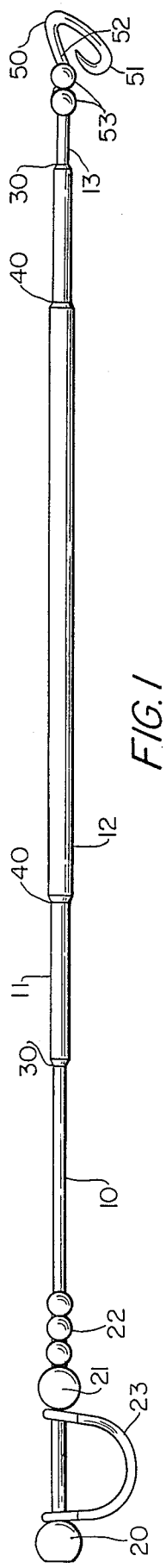
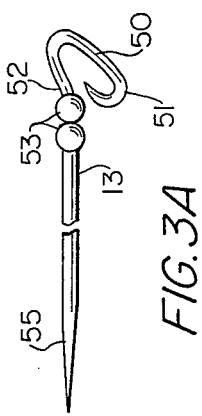
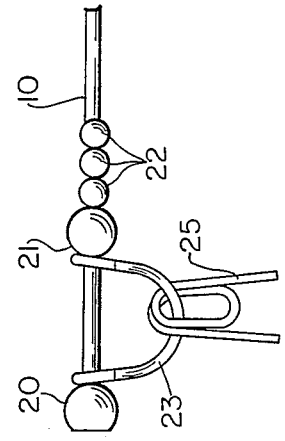
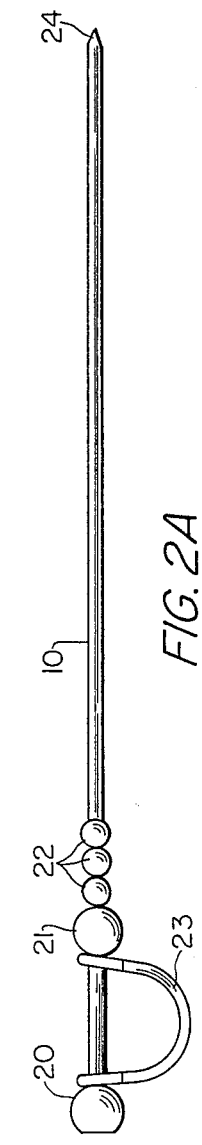
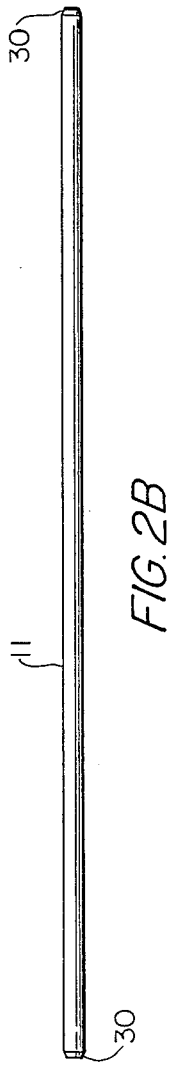
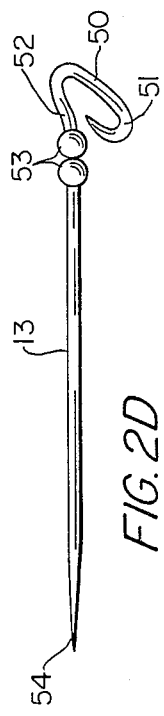
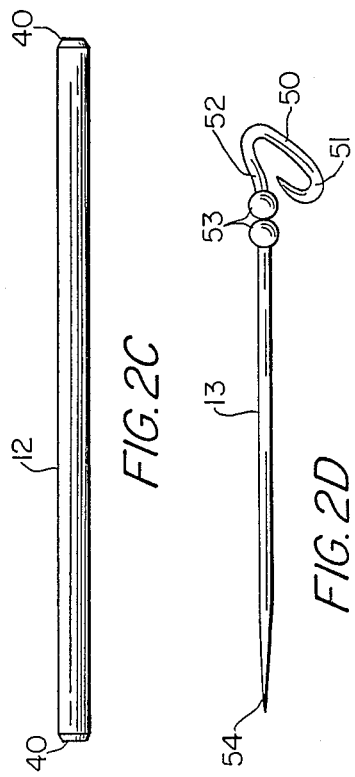

FLY TYING COMBINATION TOOL

BACKGROUND

This invention is a fly-tier's combination instrument comprising a hackle plier clasp, two knot-tying tools of different diameter, a fur and hair spinning tool, and a dubbing pluck needle. These tools are combined in a telescoping instrument providing flexibility and ease of tying flies.

A variety of tools have been developed for tying flies. Most of these tools require considerable skill and practice in order to master their use. Also, none of these tools incorporate in one instrument all the tools needed to successfully tie flies. The present invention is designed to provide some of the primary tools needed by the fly-tier in the construction of small or large flies. In addition, the combination of tools into telescoping members significantly decreases the amount of expertise and manual dexterity required of the fly-tier. Other tools, such as U.S. Pat. No. Re. 29,604 attempt to solve the problem by means of a two-stage knot tying procedure. This has proven time consuming, tedious, and unsatisfactory because the thread disengages from the tool. U.S. Pat. No. 3,877,736 suffers from the same disadvantage—the user must be skilled in order to keep the thread from disengaging from the tool. U.S. Pat. No. 4,008,913 also attempts to solve the problem by providing a two-hook tool. However, this tool lacks flexibility because the tool handle is always rigid. Additionally, the only tool provided is a thread hook; the tool must be supplemented with other tools in order to completely tie a fly.

The present invention overcomes all these problems by providing a combination tool incorporating versatility and flexibility in its design. Two knot tying tools provide the housing for a telescoping implement; into one end of the housing is positioned a hackle plier clasp, and into the other end fur and hair spinning tool and dubbing pluck needle. Other uses for each of these tools is further disclosed in the specific description.

DESCRIPTION OF THE FIGURES

FIG. 1 illustrates the entire tool and the relationship of all of its parts.

FIGS. 2A through 2D illustrates each of the parts separated. FIG. 2A is the hackle plier clasp. FIGS. 2B and 2C are the knot tying tools. FIG. 2D is the fur and hair spinning tool and dubbing pluck needle.

FIGS. 3A through 3B illustrates a more detailed view of the dubbing pluck needle and fur and hair spinning tool (FIG. 3A) and the hackle plier clasp (FIG. 3B).

SPECIFIC DESCRIPTION OF THE INVENTION

With reference to the drawings, FIG. 1 illustrates the interrelation of all the members constituting the combination tool. A first member 10 is a substantially straight elongated member terminating in a point 24 (FIG. 2A) and containing a clasp means 23 suitable for holding a hackle plier. In fly tying, this tool enables the tier to place material on a shank of a fishing hook without twisting the material, a problem common to most fly tying tools. First member 10 slidingly engages a substantially straight second member 11, a tool suitable for tying knots. The ends 30 of second member 11 are preferably beveled so that a knot will easily slide off the member 11. Second member 11 slidingly engages a substantially straight third member 12 also suitable for tying knots. The ends 40 of third member 12 are also preferably beveled so that a knot will easily slide off the tool. Two knot-tying members are included in this combination tool because a variety of knot sizes are required. A knot, preferably one or more half hitches, are tied on the member; end 30 or 40 are then placed on the fly to be tied, or over the hook to which a fly is being tied, allowing the knot to slide off the member directly onto the area requiring the knot. In the case of smaller flies, second member 11 is more suitable for tying knots; for larger flies, third member 12 is more suitable. The length of second member 12 is such that third member 12 acts as a sleeve covering the middle portion of second member 12. FIG. 1 shows that both ends 30 of second member 11 extend beyond the ends 40 of third member 12. A fourth member 13 can therefore slidingly engage into second member 11. Fourth member 13 is a substantially straight tool comprising a combination instrument in itself. FIG. 2D illustrates fourth member 13 comprises a needle-like end 54, and extending away from end 54 is a fur and hair spinning tool or hook 50. Needle-like end 54 is a dubbing pluck needle; tool 50 engages thread to hold and guide a thread loop so that the twisted thread may be easily wrapped around a fishing hook shank.

As is mentioned above, members 10, 11, 12 and 13 are all slidingly engaged with one another, and are designed to comprise a telescoping tool. In its most collapsed position, the tool is substantially rigid. The adjustability of the flexibility of the tool gives the fly tier greater tensile pressure control on the fly tying materials. Greater tensile control produces fewer material breakages. Novice tiers will find this rigidity a trait common to all the tools found in the prior art, that is too inflexible. Therefore, for the novice and expert tiers alike, this tool may be extended so that the entire tool is more flexible, i.e., it gives a little with the small amount of pressure exerted when tying flies. This means that tiers may tie flies with decreased risk of breaking the various materials used in tying flies.

The flexibility of the tool gives the fly tier, expert or novice, a greater range of sensitivity of the tension applied during fly tying in order to accomodate the varieties of tensile strengths in fly tying materials.

In short, the combination tool of the present invention provides variable flexibility in order to accomodate and increase the skill level of the user.

While FIG. 1 illustrates the overall combination tool, FIGS. 2A through D and 3A through B illustrate each of the individual members constituting the combination tool. FIG. 2A is first member 10, terminating in point 24 and comprising a clasp means 23 rotatingly engaged to first member 10 as shown also in FIG. 3B. Bead or end stopper 20 is fixedly engaged on the end of first member 10, at the opposite end of point 24. Spacer 21 is slidingly engaged on the shaft of first member 10 in such a manner that beads 20 and spacer 21 limit the movement of clasp 23. Clasp means 23 is designed to hold hackle pliers 25. The size of clasp 23 may be altered to accomodate most hackle pliers 25. Spacer 21 is engaged on the shaft of first member 10 with freedom to rotate on its own axis and to shift lengthwise along the shaft. Beads or stoppers 22 are fixedly positioned along the shaft in order to limit the movement of spacer 21, thereby limiting the movement along the shaft of clasp 23. This arrangement of beads and spacers is designed to accomodate any size clasp 23 or hackle plier 25 (FIG. 3B).

At least one spacer 21 is preferred, and at least one bead 22 is required. The preferred embodiment of the invention is illustrated in the drawings—one bead 20, one spacer 21, and three beads 22. Also, although beads are illustrated and preferred, any means may be used, such as nuts, or glue or plastic drops, or nylon or plastic forms. This invention only requires that the means used at beads 20 and 22 are fixed or securely fitted to the shaft of first member 10, and that spacer or means 21 be rotatably or movably mounted on the shaft of first member 10.

FIG. 2A also illustrates first member 10 terminating in a point 24. This need not be a needle-like point; a blunt ending may be used. A preferred embodiment of point 24, however, includes a point 24 suitable for breaking or cutting thread. The preferred means of accomplishing this is by slightly tapering the end in such a manner as to provide a sharp edge.

FIG. 2B illustrates second member 11 with beveled ends 30. This member is a hollow tube whose diameter is such that first member 10 slidingly but snuggly engages with second member 11. Ends 30 are beveled so that a knot tied onto the shaft can be easily slipped off the shaft. Additionally, ends 30 may be beveled in such a manner as to provide a cutting tool for thread.

FIG. 3C illustrates third member 12 with beveled ends 40. This member is, like a second member 11, a hollow tube. Third member 12, however, is designed to slidingly and snuggly engage over second member 11. Again, ends 40 may be beveled in such a manner as to provide a cutting tool for thread.

FIGS. 2D and 3A illustrate a fourth member 13 comprising a needle-like end 54 and a hook means constituting a fur and hair spinning tool 50. Needle-like end 54 is designed to slidingly and snuggly engage into second member 11. Furthermore, end 54 is tapered 55 in such a manner that the tapering is rough ground. This tool is a dubbing pluck needle, suitable for cutting thread, roughening feathers, and for cutting and roughening synthetic materials used in the construction of wet or dry flies.

The other end of fourth member 11 is a fur and hair spinning tool or hook 50. Hook 50 is bent or curved at positions 51 and 52 so as to form small areas where the thread will lie naturally. This reduces the propensity for the thread to slide off the hook while wrapping the thread around a fishing hook. Additionally, beads or means 53 are fixedly engaged on the shaft of member 13 at a point adjacent to bent position 52 in order to provide additional guiding and holding means for the thread. The beads illustrated are preferred; however nuts, glue, nylon or plastic forms, or any fixed means may be incorporated.

Although the means, members and tools described above may be designed differently but accomplish the same purpose as is specified above, the present invention incorporates those slight design alterations. Additional alterations or additions are set out below.

The shafts of members 10, 11, 12 and 13 are substantially straight members. It has been found that the addition of a slight bend in these members is preferred in order to add a little friction to the slidingly engaged members. These bends facilitate the combination tool staying together when the tool is in its most expanded telescoping position.

It is preferred that bead 20 is fixedly positioned on the shaft of first member 10 by crimping or hammering the end. Beads 22 and 53 may be fixedly positioned by placing a small amount of glue or the like as a coating over the bead. Other means of fixing the beads may be used.

It is preferred that second member 11 and third member 12 are made of hollow brass tubing. First member 10 can be made of solid brass; and fourth member 13 is preferably constructed of stainless steel. Other materials may be used.

This combination tool may be used in various fly tying procedures and techniques for tying wet flies, dry flies, nymphs, streamers and other fly tying patterns.

I claim:

1. A tool for tying a fly comprising, in combination, an elongated member comprising a plurality of telescoping parts which can be extended and collapsed; said plurality of telescoping parts comprising: (a) a first member having a clasp means at one end and terminating in a point extending away from said clasp means; (b) a second member suitable for tying knots and slidingly engaged over said first member; (c) a third member suitable for tying knots and slidingly engaged over said second member; (d) a fourth member terminating in a needle-like point at one end and a hook means extending away from said point, said hook means adapted for fur and hair spinning, whereby said telescoping parts may be used in combination or separately.

2. A tool according to claim 1 wherein said tool includes a first member terminating in a point and extending away from said clasp means.

3. A tool according to claim 1 wherein said telescoping parts include a substantially straight second member suitable for tying knots.

4. A tool according to claim 3 wherein said telescoping parts include a substantially straight third member suitable for tying knots.

5. A tool according to claim 3 wherein said third member terminates in a tapered end, said tapered end so beveled as to be suitable for cutting or breaking thread.

6. A tool according to claim 1 wherein said telescoping parts include a needle-like fourth member terminating in a point and a hook means extending away from said point, said hook means adapted for fur and hair spinning.

7. A tool according to claim 1 wherein said elongated member and said telescoping parts slidingly engage one another.

8. A tool according to claim 1 wherein said elongated member is adapted to be flexible in one telescoping position and rigid in another telescoping position.

9. A tool according to claim 1 wherein said elongated member includes a first frictional sleeve slidingly engaged over said elongated member and at least one second friction sleeve slidingly engaged over said first frictional sleeve.

10. A tool according to claim 1 wherein said vise means is a hackle plier.

* * * * *